US009041860B2

(12) United States Patent
Buchheit (10) Patent No.: US 9,041,860 B2
(45) Date of Patent: May 26, 2015

(54) SIMULTANEOUSLY PRESENTING AN ENHANCED AND PRIMARY STREAM ASSOCIATED WITH A DIGITAL TELEVISION BROADCAST (76) Inventor: Brian K. Buchheit, Weston, FL (US)

( * ) Notice: Subject to any disclaimer, the term of this patent is extended or adjusted under 35 U.S.C. 154(b) by 90 days.

(21) Appl. No.: 13/118,679

(22) Filed: May 31, 2011

(65) Prior Publication Data
US 2012/0307145 A1 Dec. 6, 2012

(51) Int. Cl.
H04N 21/242 (2011.01)
H04N 21/43 (2011.01)
H04N 21/8547 (2011.01)
H04N 21/41 (2011.01)

(52) U.S. Cl.
CPC ......... *H04N 21/242* (2013.01); *H04N 21/4307* (2013.01); *H04N 21/8547* (2013.01); *H04N 21/4126* (2013.01)

(58) Field of Classification Search
CPC .................................................... H04N 21/242
USPC ............................................... 348/500, 208.3
See application file for complete search history.

(56) References Cited

U.S. PATENT DOCUMENTS

| | | | |
|---|---|---|---|
| 6,624,846 B1 * | 9/2003 | Lassiter ..................... | 348/211.4 |
| 8,250,617 B2 | 8/2012 | Hensgen et al. | |
| 2008/0120668 A1 * | 5/2008 | Yau ................................ | 725/110 |
| 2008/0244576 A1 | 10/2008 | Kwon et al. | |
| 2008/0307467 A1 | 12/2008 | Kim et al. | |
| 2008/0307478 A1 * | 12/2008 | Kim et al. ...................... | 725/114 |
| 2009/0320073 A1 * | 12/2009 | Reisman ......................... | 725/51 |
| 2010/0146576 A1 * | 6/2010 | Costanzo et al. ............. | 725/117 |
| 2011/0137766 A1 * | 6/2011 | Rasmussen et al. ............ | 705/30 |
| 2013/0054820 A1 | 2/2013 | Reisman | |

OTHER PUBLICATIONS

AT&T U-verse starter guide—att.com/uversesupport—pp. 1-15.
IPTV Network Infrastructure—by Shahbaz Rahmanian Huawei—srahmanian@huawei.com; Dec. 2008; Huawei Technologies Co., Ltd.; pp. 1-32.
Live Sports—Nascar and Other Sports; Dated Apr. 29, 3013.
Split screen option similar to multiview with Uverse; Apr. 29, 2013. AT&T—verse TV Multiview Apps.

* cited by examiner

*Primary Examiner* — Jefferey Harold
*Assistant Examiner* — Justin Sanders
(74) *Attorney, Agent, or Firm* — Patents on Demand P.A.; Brian K. Buchheit; Scott M. Garrett (57) ABSTRACT An enhanced stream associated with a primary stream can be selected. The enhanced stream can be time-synchronized to the primary stream. The enhanced stream can be associated with a secondary viewpoint linked to a primary viewpoint of the primary stream. The primary stream can be a broadcast signal of a digital television broadcast. The enhanced stream can be simultaneously presented on a secondary device and the primary stream on a primary device. The primary device can be a computing device and the secondary device can be a computing device.

16 Claims, 8 Drawing Sheets

SIMULTANEOUSLY PRESENTING AN ENHANCED AND PRIMARY STREAM ASSOCIATED WITH A DIGITAL TELEVISION BROADCAST

BACKGROUND

The present invention relates to the field of digital television and, more particularly, to simultaneously presenting an enhanced and primary stream associated with a digital television broadcast.

During sporting seasons, sports fans often converge in front of televisions to watch their favorite broadcasted sporting events. Ardent sports fans often watch their favorite teams from pre-season to post-season, attempting to catch every moment of sports coverage. Coverage often includes multiple cameras capturing footage which can be edited down into a single stream for broadcast. For example, coverage can include a first camera footage of a play followed by a second camera footage from a different perspective. Typically this second camera footage is often used for replays and analysis for commentators. This type of coverage is common place during sporting events, allowing fans to become immersed in the coverage by experiencing different vantage points of a game.

Fans often gather together to watch the broadcast at game-day parties in their homes when their favorite team is playing. These game-day parties often include large numbers of friends and relatives who are supporters of the playing teams. Many times, fans may want to re-watch a play which has been missed. For example, a quick trip to the restroom often results in a missed offensive play which can turn the tide of the game. Further, a fan may want to view a different version of the coverage (e.g., from a different camera angle). For example, a camera angle showing a defensive play which they missed. In these instances, fans must wait for recaps and/or replays which may or may not show missed game footage.

In many of these gatherings, fans often have mobile phones which they can frequently look up sports scores (e.g., other ongoing games) and highlights. Many of these mobile phones have significant video and audio capabilities which often go untapped. For example, many smart phones can provide video-on-demand services from sports feeds to movies. It would be beneficial to leverage these mobile device capabilities to enhance game-day experience.

BRIEF SUMMARY

One aspect of the present invention can include a system, an apparatus, a computer program product, and a method for simultaneously presenting an enhanced and primary stream associated with a digital television broadcast. An enhanced stream associated with a primary stream can be selected. The enhanced stream can be time-synchronized to the primary stream. The enhanced stream can be associated with a secondary viewpoint linked to a primary viewpoint of the primary stream. The primary stream can be a broadcast signal of a digital television broadcast. The enhanced stream can be simultaneously presented on a secondary device and the primary stream on a primary device. The primary device can be a computing device and the secondary device can be a computing device.

Another aspect of the present invention can include a method, an apparatus, a computer program product, and a system for simultaneously presenting an enhanced and primary stream associated with a digital television broadcast. A media engine can be able to manage a primary stream and an enhanced stream. The enhanced stream can be synchronized with the primary stream. The primary stream is associated with a broadcast signal of a digital television broadcast. A data store can be able to persist synchronization data associated with the primary and enhanced stream.

Yet another aspect of the present invention can include a computer program product that includes a computer readable storage medium having embedded computer usable program code. The computer usable program code can include an interface able to be configured to synchronously present a primary stream and an enhanced stream upon a plurality of computing devices. The primary stream can be associated with a digital television broadcast. An interface element associated with the interface can be operable to select an enhanced stream associated with a primary stream.

DETAILED DESCRIPTION

The present disclosure is a solution for simultaneously presenting an enhanced and primary stream associated with a digital television broadcast. In the solution, a primary stream can be associated with an aspect (e.g., field of view) of a content broadcast. The enhanced stream can be associated with a different aspect (e.g., different field of view) of the same content broadcast. The primary stream can be presented on a primary computing device. The enhanced stream can be concurrently presented on a secondary computing device. For example, the primary stream can be presented on a television and the enhanced stream can be presented on a mobile phone simultaneously. The enhanced stream can be time-synchronized to the primary stream. That is, the audio and video component of the enhanced stream and primary stream can be synchronized allowing concurrent playback. In one instance, the audio stream can be identical and the video stream can be different.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
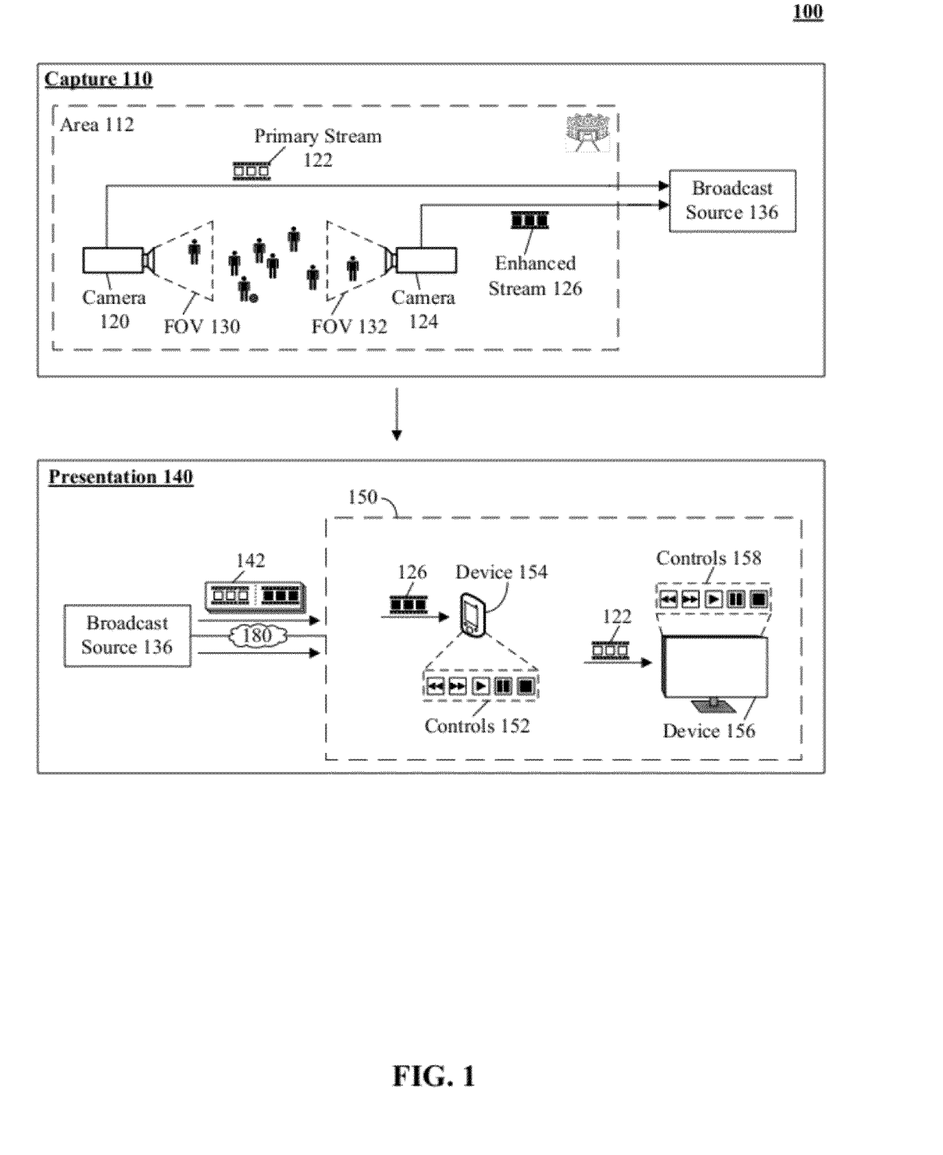
FIG. 1 is a schematic diagram illustrating a system for simultaneously presenting an enhanced and primary stream associated with a digital television broadcast in accordance with an embodiment of the inventive arrangements disclosed herein.
Figure 2:
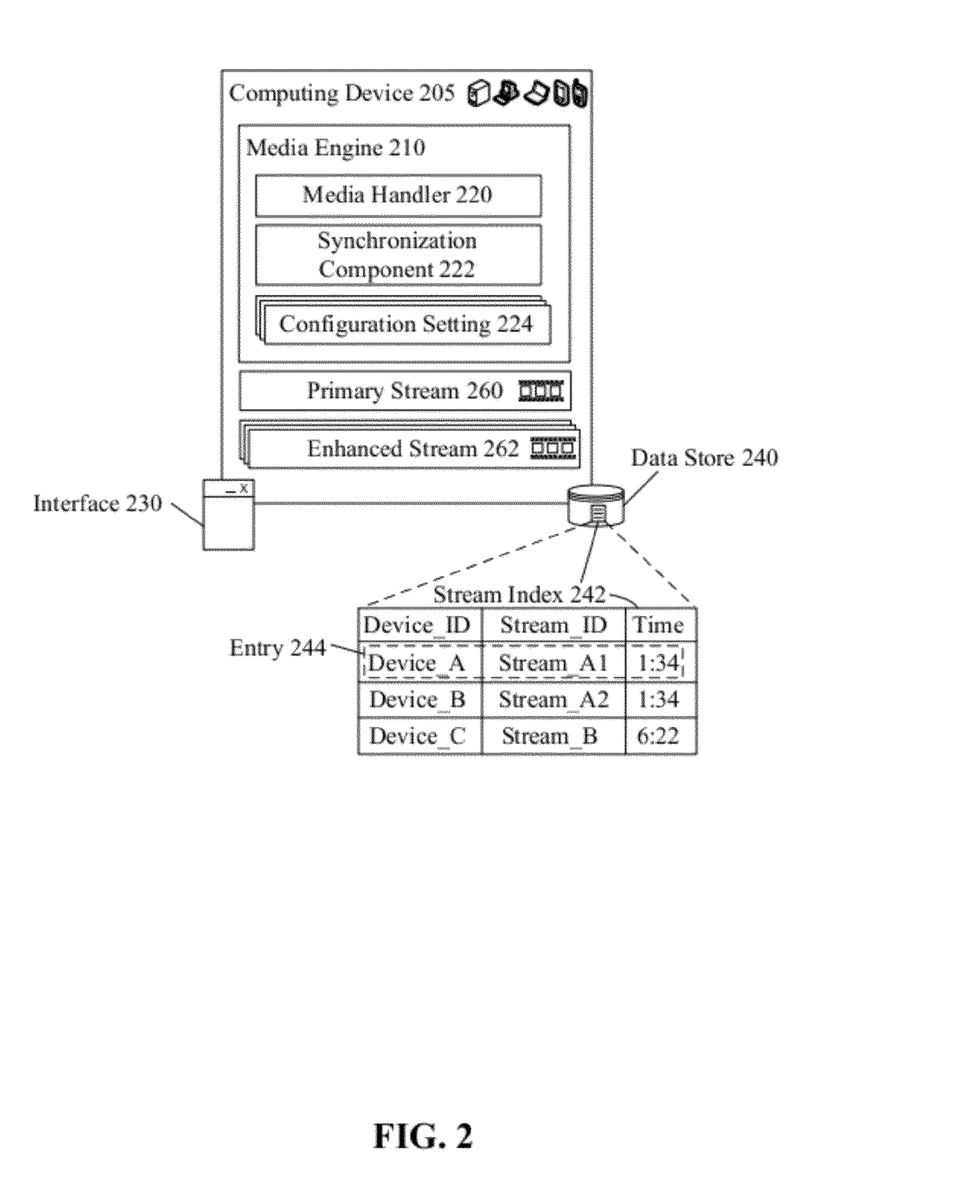
FIG. 2 is a schematic diagram illustrating a system for simultaneously presenting an enhanced and primary stream associated with a digital television broadcast in accordance with an embodiment of the inventive arrangements disclosed herein.
Figure 3:
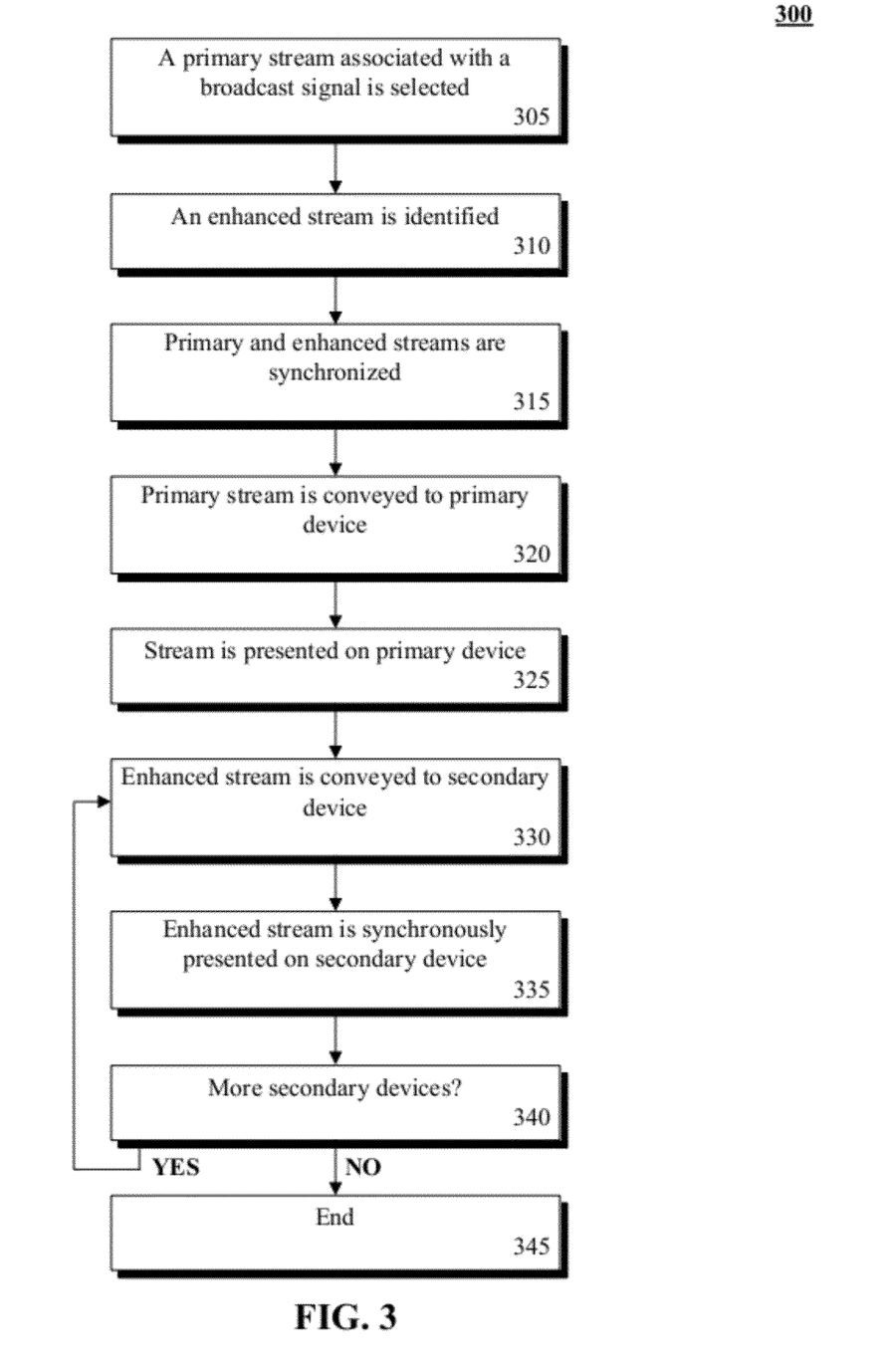
FIG. 3 is a schematic diagram illustrating a method for simultaneously presenting an enhanced and primary stream associated with a digital television broadcast in accordance with an embodiment of the inventive arrangements disclosed herein.

FIG. 1 is a schematic diagram illustrating a system 100 simultaneously presenting an enhanced and primary stream associated with a digital television broadcast in accordance with an embodiment of the inventive arrangements disclosed herein. System 100 can be associated with the context of system 200 and/or method 300. In system 100, a capture 110 stage and a presentation 140 stage can permit the concurrent presentation of linked media streams (e.g., primary stream 122, enhanced stream 126) upon multiple computing devices. In capture 110 stage, multiple cameras 120, 124 (e.g., TV cameras) can be utilized to obtain a set of media streams (e.g., stream 122, 126) which can be conveyed to a broadcast source 136. In presentation 140, streams 122, 126 can be conveyed to a set of computing devices 154, 156. For example, two viewers can watch the same TV channel different view different coverage (e.g., stream 122, 126) of a football game being played within an arena (e.g., area 112). It should be appreciated that the disclosure is distinct from traditional solutions where the disclosure can convey and present multiple media streams associated with a broadcast signal.

As used herein, the primary stream 122 can be a broadcast stream associated with a broadcast signal (e.g., signal 142). Primary stream 122 can be associated with one or more enhanced streams 126. Stream 126 can present different content which can be associated with the content of stream 122. That is, primary stream 122 and enhanced stream 126 can include different aspects of the same content. Enhanced stream 126 can be time synchronized to the primary stream 122 permitting the different aspects of the content to be viewed in tandem. For example, a viewer can watch a soccer game replay of a goal from the point of view of the goalie while another viewer can watch an alternate camera angle of the same goal at the same time.

In system 100, a capture stage 110 or presentation stage 140 can be optional. The capture stage 110 can include multiple cameras, multiple camera types, multiple capture devices, and the like. Primary stream 122 and/or enhanced stream 126 can be determined based on broadcast source, camera 120, 124, and the like. For example, primary stream 122 can be determined based on stream quality (e.g., high definition verses standard definition). Capture stage 110 can occur historically, in real-time, and/or near real-time.

In capture stage 110, an area 112 can be associated with two or more cameras 120, 124. Each camera 120, 124 can be associated with a different field of view 130, 132 respectively. For example, camera 120, 124 can capture the same sporting event from different locations within an arena. Camera 120 field of view 130 can be associated with a primary stream 122. Camera 124 field of view 132 can be associated with an enhanced stream 126. In one instance, the enhanced stream 126 can be time synchronized to the primary stream 122 during the capture stage 110. Stream 122, 126 can be conveyed to broadcast source 136. It should be appreciated that stream 122, 126 can be conveyed to source 136 in real-time or near real-time.

Presentation stage 140 can occur historically and/or concurrently with capture stage 110. For example, stage 140 can transpire approximately during the same interval (e.g., accounting for broadcast delay) when capture stage 110 is a part of a live broadcast. Presentation 140 can be associated with traditional digital television programming elements including, but not limited to, a set-top box (e.g., cable box), satellite receiver, a digital television, a digital television network, a home network, computing devices (e.g., home media server, mobile phone, etc), and the like.

In presentation 140 stage, the broadcast source 136 can convey a broadcast signal 142 to computing devices 154, 156 via network 180. For example, primary stream 122 can be conveyed on a main channel and enhanced stream 126 can be conveyed on a subchannel associated with the main channel. Devices 154, 156 can concurrently playback stream 122, 126 upon receipt. In one instance, device 154, 156 can be associated with a home network 150 which can allow playback of multiple streams 122, 126 from a broadcast signal 142. In the instance, a broadcast channel associated with signal 142 can present stream 122, 126 upon device 154, 156 simultaneously. Stream 122, 126 can be time synchronized permitting identical timing playback to occur upon device 154, 156. For example, the audio of stream 122, 126 can be synchronized allowing the simultaneously presentation of different video with the same audio. In one embodiment, playback manipulation of primary stream 122 utilizing controls 158 can affect playback of stream 126. In another embodiment, playback manipulation of enhanced stream 126 via controls 152 can affect playback of stream 122.

Broadcast source 136 can include multiple broadcast sources including, but not limited to, a broadcast station, a digital television content provider, an internet protocol television (IPTV) content provider, a content provider, and the like. For example, broadcast source 136 can be associated with a digital cable service.

Stream 122, 126 can differ based on quality, formats, sizing, aspect ratio, interlacing and the like. For example, stream 122 can be a high definition stream and stream 126 can be a standard definition stream. Further, stream 122, 126 can differ in encoding based on target platform. For example, stream 126 can be encoded as a mobile format and delivered to a mobile phone (e.g., device 154).

In one instance, enhanced stream 126 can be conveyed to a proximate device (e.g., cable box) which can be presented upon request. Enhanced stream 126 can be accessed in a variety of user initiated and non-user initiated mechanisms. In one embodiment, an enhanced stream 126 can be selected from an on-screen menu during the presentation of a primary stream 122. For example, a program guide can present available enhanced streams 126 associated with a primary stream 122.

In one instance, stream 126 can be conveyed on-demand to a device in response to a user selection. In the instance, a content guide can present device selection capabilities of available enhanced streams associated with a primary stream. In one embodiment, a list of proximate devices can be selected from a device presenting primary stream 122. In another embodiment, an enhanced stream 126 can be selected from a proximate device. For example, an enhanced stream 126 can be a pay-per-view mobile content associated with the primary stream 122 which can be presented on a tablet computer.

Drawings presented herein are for illustrative purposes only and should not be construed to limit the invention in any regard. It should be appreciated that the disclosure can utilize a primary stream and an enhanced stream obtained from any source (e.g., pre-recorded streams). System 100 can perform time-synchronization during capture 110 and/or presentation 140 stage. System 100 can be a component of a distributed content system, distributed content delivery platform, and the like.

FIG. 2 is a schematic diagram illustrating a system 200 for simultaneously presenting an enhanced and primary stream associated with a digital television broadcast in accordance with an embodiment of the inventive arrangements disclosed herein. System 200 can be present in the context of system 100 and/or method 300. In system 200, a stream index 242 can be utilized to synchronize and concurrently present a primary stream 260 and an enhanced stream 262. Stream index 242 can be continuously updated as stream 260, 262 is presented. In one instance, stream 260, 262 can be presented simultaneously within interface 230.

As used herein, stream 260, 262 can include an audio and/or a video element. Stream 260, 262 can conform to traditional digital television and/or Internet Protocol Television (IPTV) broadcast formats. Formats can include, but is not limited to MOVING PICTURE EXPERTS GROUP 2 (MPEG-2), MP3, Audio Codec 3 (AC-3), Advanced Audio Coding (AAC), MPEG-4, and the like. Stream 260, 262 can include pre-recorded streams, "live" streams, time-delayed broadcast streams, and the like. Stream 260, 262 can be stored within media engine 210, data store 240, and the like.

Media engine 210 can be a hardware/software component for managing stream 260, 262 synchronization and/or presentation. Engine 210 functionality can include, but is not limited to, stream buffering, request negotiation, authentication, and the like. Engine 210 can be a distributed component communicatively linked to one or more playback and/or presentation devices. Engine 210 can be a component of a content delivery platform, a set-top box, a television, a mobile computing device, and the like. In one instance, engine 210 can be a component of an application programming interface (API). In another instance, engine 210 can be a feature of a media plug-in of a media player.

Media handler 220 can be a hardware/software element configured to manage stream 260, 262. Handler 220 functionality can include, but is not limited to: encryption/decryption, encoding/decoding, and the like. Handler 220 can utilize index 242 to process stream requests from one or more computing devices. For example, entry 255 can track a Stream_A1 stream request from a Device A device. Handler 220 can execute in real-time and/or near real-time. In one instance, handler 220 can perform digital video recording functionality. For example, handler 220 can record a primary stream and three associated enhanced streams to data store 240.

Synchronization component 222 can be a hardware/software entity for synchronizing enhanced stream 262 with primary stream 260. Component 222 functionality can include, frame skipping capabilities, real-time editing functions, playback capabilities, and the like. Component 222 can synchronize audio and/or video elements of streams 260, 262. In one instance, component 222 can utilize index 242 to track timing parameters of streams 260, 262 during playback. In the instance, component 222 can update index 242 in real-time or near real-time.

Configuration setting 224 can be one or more parameters for establishing the behavior of system 200. Setting 224 can include, but is not limited to, handler 220 settings, component 222 configuration, and the like. Setting 224 can be stored within engine 210, data store 240, and the like. Setting 224 can include user configured settings, content provider established parameters, stream 260, 262 settings, index 242 settings, and the like.

Index 242 can be one or more data sets for maintaining synchronization and/or playback of stream 260, 262. Index 242 can include, but is not limited to, device identifier, stream identifier, timing values, security settings, and the like. For example, index 242 can include entry 244 which can track multiple devices, multiple streams, and synchronization parameters. It should be appreciated that index 242 can be an optional component of system 200.

Interface 230 can be a user interactive component permitting interaction with a media engine and/or stream 260, 262. Interface 230 can be a graphical user interface (GUI), voice user interface (VUI), mixed-mode interface, touch sensitive interface, and the like. In one instance, interface 230 can present stream 262 in response to a presentation of stream 260 upon a computing device. Interface 230 can be communicatively linked to computing device 205.

Data store 240 can be a hardware/software component able to store stream index 242. Data store 240 can be a Storage Area Network (SAN), Network Attached Storage (NAS), and the like. Data store 240 can conform to a relational database management system (RDBMS), object oriented database management system (OODBMS), and the like. Data store 240 can be communicatively linked to computing device 204 and/or media engine 210 in one or more traditional and/or proprietary mechanisms.

Drawings presented herein are for illustrative purposes only and should not be construed to limit the invention in any regard. System 200 can be associated with one or more content delivery protocols and/or network protocols. Protocols can include, but are not limited to, Internet Protocol (IP), Transmission Control Protocol (TCP), Real-time Streaming Protocol (RTSP), Real-time Transport Protocol (RTP), and the like.

FIG. 3 is a schematic diagram illustrating a method 300 for simultaneously presenting an enhanced and primary stream associated with a digital television broadcast in accordance with an embodiment of the inventive arrangements disclosed herein. Method 300 can be present in the context of system 100 and/or system 200. In method 300, a primary and enhanced stream can be communicated to a primary device and a secondary device. The primary and secondary device can present the streams concurrently enabling two or more different aspects of a broadcast content to be viewable.

In step 305, a primary stream associated with a broadcast signal can be selected. The primary stream can be automatically selected based on broadcast content provider management. For instance, the primary stream can be a movie being broadcast according to a program schedule. In step 310, an enhanced stream is identified. The enhanced stream can be identified automatically and/or manually. In one instance, a viewer can select an enhanced stream associated with the primary stream. In the instance, information associated with the enhanced stream can be presented, enabling a viewer to decide on enhanced stream selection. In step 315, primary and enhanced streams can be synchronized. The synchronization can be performed automatically based on the enhanced stream selection.

In step 320, the primary stream can be conveyed to a primary device. In step 325, the primary stream can be presented upon the primary device. In step 330, the enhanced stream can be conveyed to the secondary device. In step 335, the enhanced stream can be synchronously presented upon the secondary device. In step 340, if more secondary devices are available, the method can return to step 330, else continue to step 345. In step 345, the method can end.

Drawings presented herein are for illustrative purposes only and should not be construed to limit the invention in any regard. Method 300 can continuously execute steps 305-340 as a primary stream selection is modified.

Figure 4A:
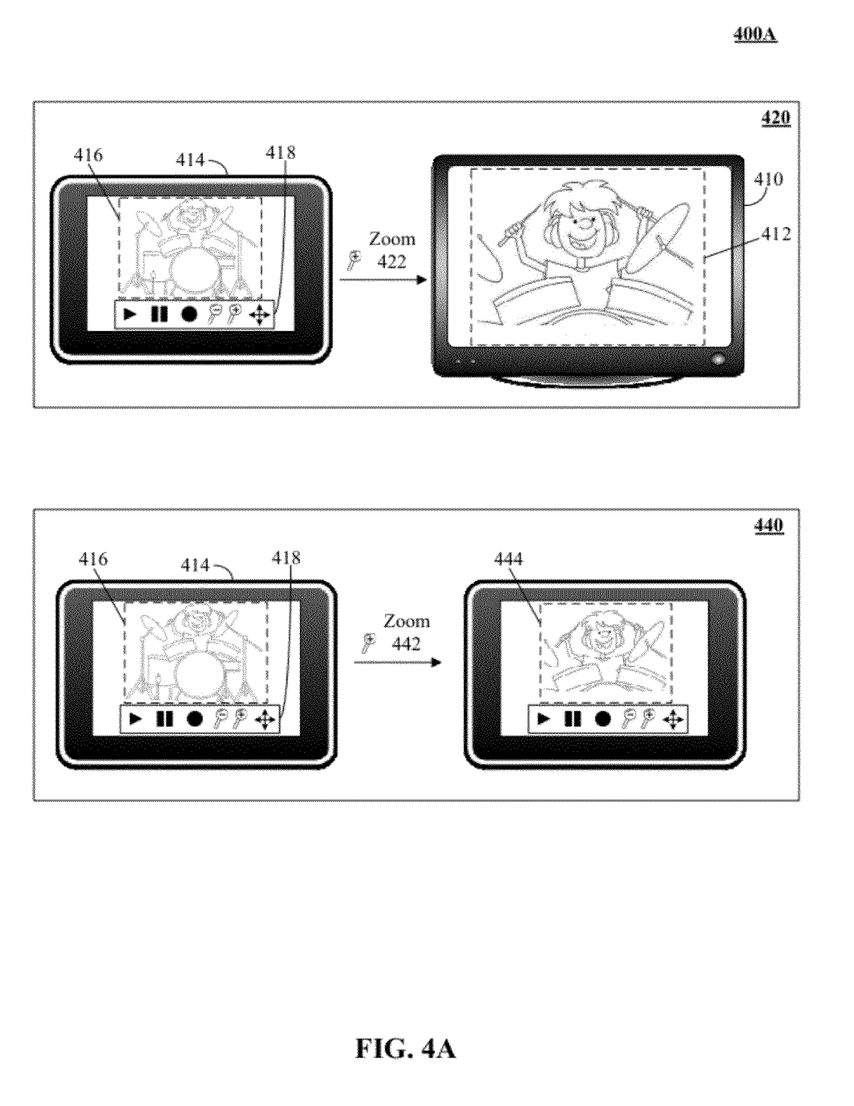
FIG. 4A is a schematic diagram illustrating a set of embodiments for simultaneously presenting an enhanced and primary stream associated with a digital television broadcast in accordance with an embodiment of the inventive arrangements disclosed herein.

FIG. 4A is a schematic diagram illustrating a set of embodiments 420, 440 for simultaneously presenting an enhanced and primary stream associated with a digital television broadcast in accordance with an embodiment of the inventive arrangements disclosed herein. Embodiments 420, 440 can be present in the context of system 100, 200, and method 300. Embodiments 420, 440 can include a primary device 410 and a secondary device 414. Primary device 410 can present primary stream 412 and secondary device 414 can present enhanced stream 416. In embodiment 420, a zoom functionality enacted upon device 414 can affect stream 412 presented upon primary device 410. That is, device 410 can perform control capabilities commonly present in remote controls (e.g., television remote control). In embodiment, 440, a zoom functionality enacted upon device 414 can affect enhanced stream 416 presented upon device 414.

In one configuration of the embodiment 420, secondary device 414 can include controls 418. Controls 418 can include on-screen controls, physical button controls, and the like. Controls 418 can include playback controls (e.g., play, pause), stream manipulation controls (e.g., pan, zoom), and the like. Upon selection of a zoom functionality from controls 418, zoom 422 command can be conveyed to primary device 412. Zoom 422 command can alter the presentation of stream 412 causing a zoom functionality to be executed. For example, a user can utilize tablet 414 to cause a portion of primary stream 412 to become twenty percent larger.

In one configuration of embodiment 440, a zoom action initiated upon secondary device via controls 418 can affect playback of enhanced stream 416. A primary stream (e.g., primary stream 412) associated with the enhanced stream 416 can be unaffected. Zoom functionality associated with controls 418 can be dynamic and/or static. For example, a lasso tool can be utilized to dynamically scale a user selected area.

Drawings presented herein are for illustrative purposes only and should not be construed to limit the invention in any regard. It should be appreciated that embodiments 420, 440 can include any playback controls and/or stream modification controls including, but not limited to, pan, zoom, rotate, aspect transform, visual filters, audio filters, and the like.

Figure 4B:
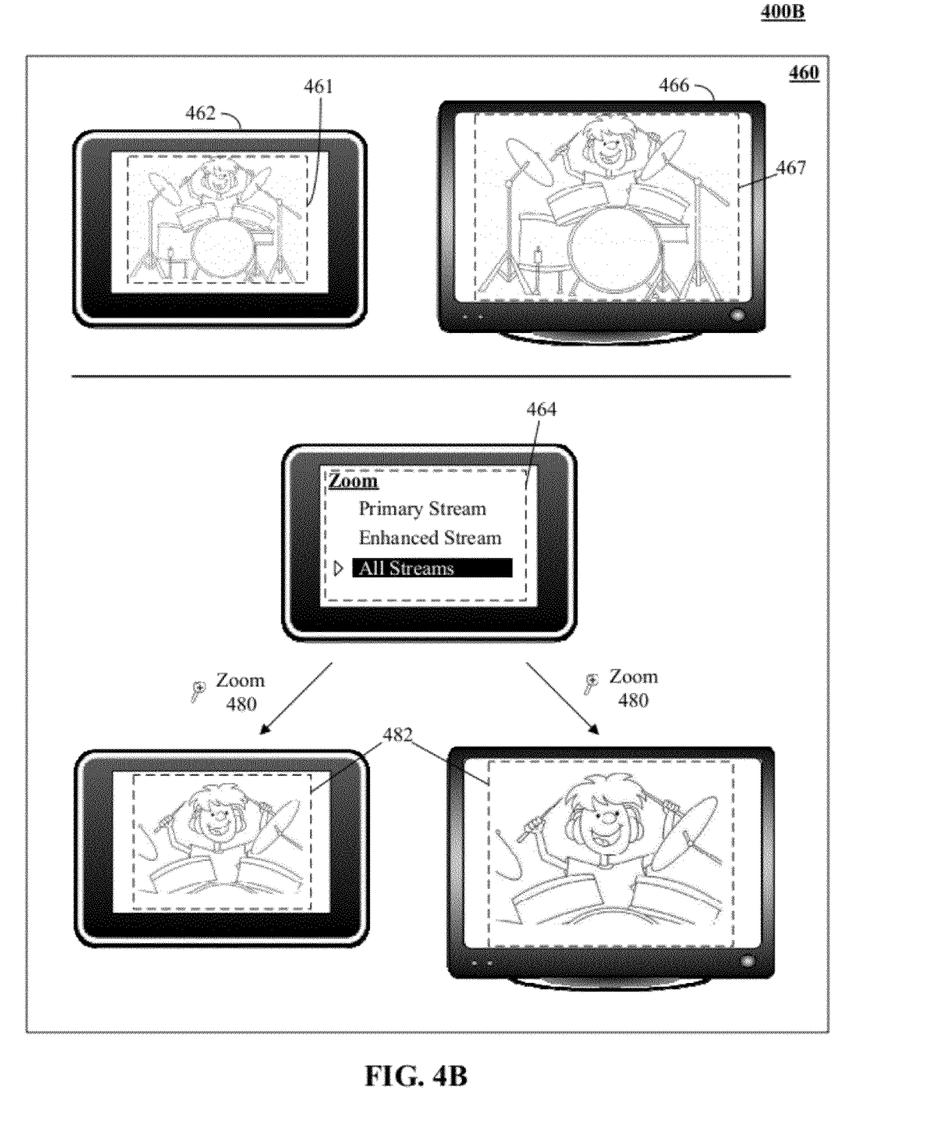
FIG. 4B is a schematic diagram illustrating an embodiment for simultaneously presenting an enhanced and primary stream associated with a digital television broadcast in accordance with an embodiment of the inventive arrangements disclosed herein.

FIG. 4B is a schematic diagram illustrating an embodiment 460 for simultaneously presenting an enhanced and primary stream associated with a digital television broadcast in accordance with an embodiment of the inventive arrangements disclosed herein. Embodiment 460 can be present in the context of system 100, 200 and method 300. In embodiment 460, an on-screen menu 464 can permit a zoom functionality to be enacted upon a primary stream 467 and one or more enhanced streams 461. Primary stream 467 and enhanced stream 461 can be presented upon device primary device 466 and secondary device 462 concurrently. On-screen menu 464 can be presented in response to a user initiated action. For example, menu 464 can be presented when a user double taps the viewing area of tablet 464 during stream 461 playback. It should be appreciated that menu 464 can be presented via user initiated gestures (e.g. pinch, drag).

In one configuration of embodiment 460, on-screen menu 464 can be a selection menu allowing zooming functionality upon a primary stream 467 and enhanced stream 461 in real-time. Responsive to a selection of menu item within menu 464, a zoom 480 command can be conveyed to relevant devices. For example, menu 464 can permit a pre-defined zoom in functionality to be applied to stream 467 and enhanced stream 461. Region 482 can be presented upon device 462, 466 upon receipt of command 480. It should be appreciated that region 482 can be similar based on stream 461, 467 aspect ratios, encoding, fidelity, and the like.

Drawings presented herein are for illustrative purposes only and should not be construed to limit the invention in any regard. It should be appreciated that error handling can be associated with the embodiment 420, 440, 460. For example, if playback is interrupted, an appropriate error can be presented, indicating a failure to manipulate stream playback.

Figure 5:
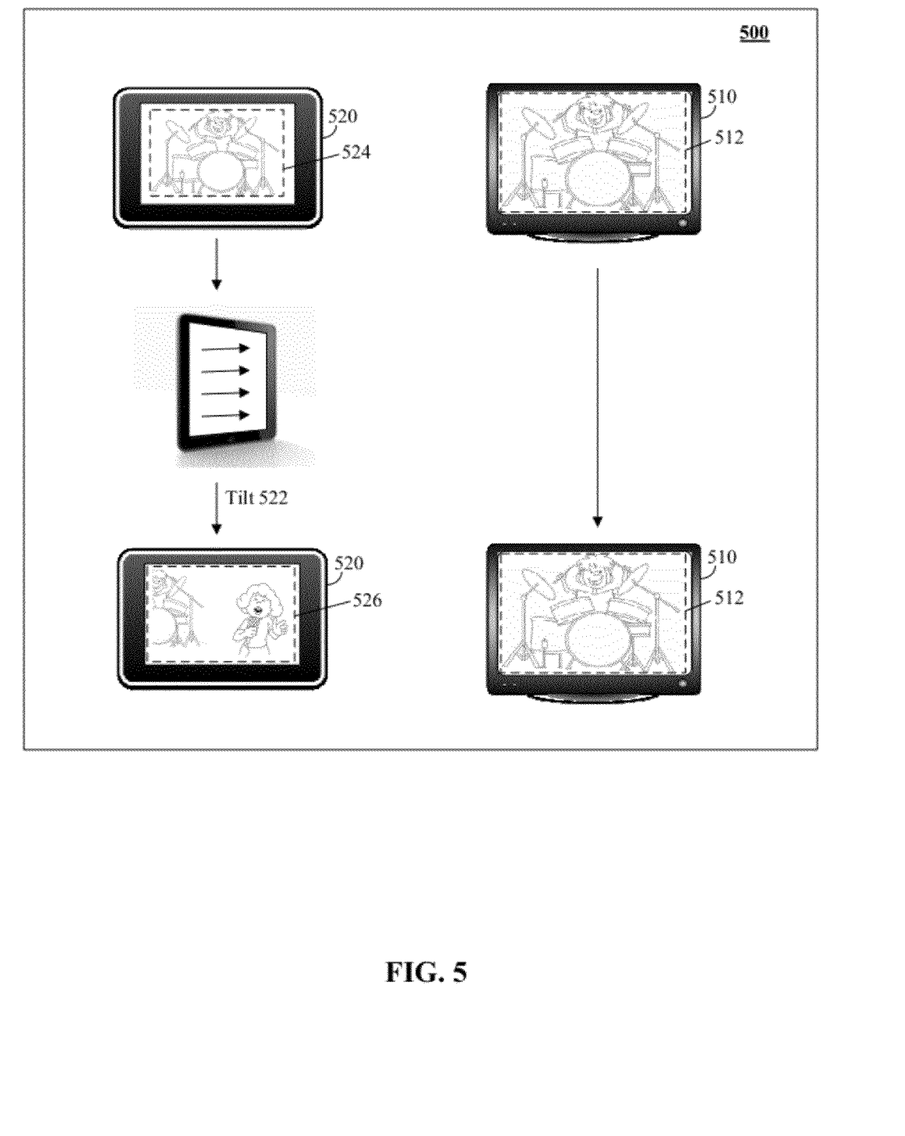
FIG. 5 is a schematic diagram illustrating an embodiment for simultaneously presenting an enhanced and primary stream associated with a digital television broadcast in accordance with an embodiment of the inventive arrangements disclosed herein.

FIG. 5 is a schematic diagram illustrating an embodiment 500 for simultaneously presenting an enhanced and primary stream associated with a digital television broadcast in accordance with an embodiment of the inventive arrangements disclosed herein. Embodiment 500 can be present in the context of system 100, 200 and method 300. In embodiment 500, primary stream 512 can be presented on primary device 510 and enhanced stream 524 can be presented on secondary device 520. Secondary device 520 can be used to manipulate stream utilizing motion input received from a user action. For example, a user can tilt tablet 520 to pan in any direction of an enhanced stream 524.

In one configuration of embodiment 500, secondary device 520 can include motion input capabilities (e.g., accelerometer) which can be mapped to stream modification functionality. For example, tilting the tablet (e.g., along the z-axis) to the right can pan the stream to the right presenting portion 526 of stream 524. In one instance, stream 512 can be unaffected by changes in stream 524.

Drawings presented herein are for illustrative purposes only and should not be construed to limit the invention in any regard. It should be understood that motion input able to manipulate stream can include, shaking, rotating, and the like. Further, motion input can be received from accessory devices including game controllers, remote controls, and the like.

Figure 6:
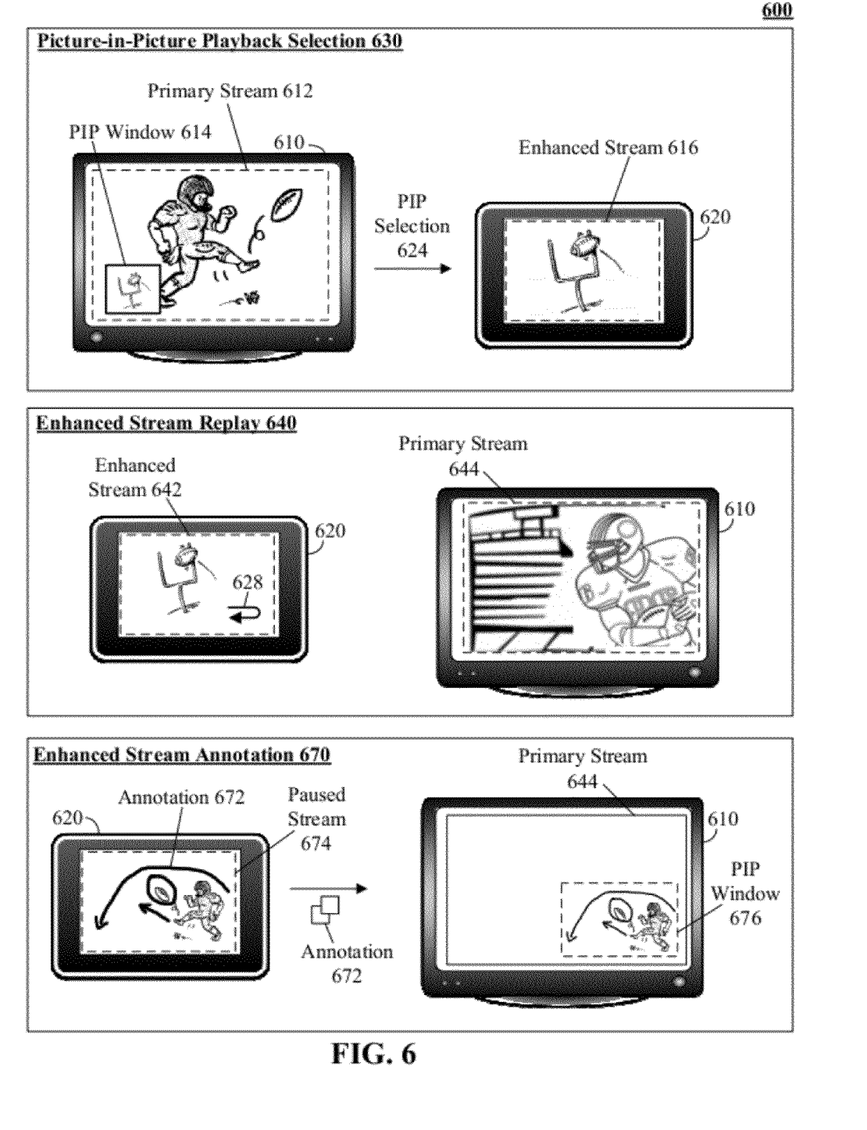
FIG. 6 is a schematic diagram illustrating a series of embodiments for simultaneously presenting an enhanced and primary stream associated with a digital television broadcast in accordance with an embodiment of the inventive arrangements disclosed herein.

FIG. 6 is a schematic diagram illustrating a series of embodiments 630, 640, 670 for simultaneously presenting an enhanced and primary stream associated with a digital television broadcast in accordance with an embodiment of the inventive arrangements disclosed herein. Embodiment 630, 640, 670 can be present in the context of system 100, 200 and method 300. In embodiment 630, a picture-in-picture (PIP) window 614 presenting an enhanced stream can be dynamically presented upon device 620 as enhanced stream 616. In embodiment 640, an enhanced stream 642 replay can be performed without affecting associated primary stream 644 playback. In embodiment 670, user-created annotations within a paused stream 674 (e.g., "frozen" enhanced stream) can be conveyed from a secondary device 620 to a primary device 610.

In one configuration of embodiment 630, enhanced stream 616 can be automatically presented on device 620 when a picture-in-picture window functionality is activated. In another configuration of embodiment 630, enhanced stream 616 can be presented upon user selection. For example, a media player application executing upon device 620 can permit user selection (e.g., PIP selection 624) of PIP window 614 content. In one instance, as PIP content changes, enhanced stream 616 can dynamically change.

In embodiment 640, an enhanced stream 642 can be repeatedly presented (e.g., looped) without affecting primary stream 644 playback via replay element 628 (e.g., control button overlay). In one instance, replay can be dynamically customized to user preferences. For example, a film strip can be presented of an enhanced stream 642 to permit user selection of replay content. Enhanced stream 642 can be a portion of primary stream 644, an enhanced stream and a primary stream, and the like.

In one configuration of embodiment 670, one or more annotations 672 can be created within a paused stream 674. Paused stream 674 can be an enhanced stream and/or a primary stream. Paused stream 674 can be a user selected frame from a stream presented on device 620. Annotation 672 can include, but is not limited to text, polygons (e.g., circles, squares), freehand drawing, and the like. In one instance, annotation 672 can be conveyed to a picture-in-picture window 676 of a primary device 644.

In one embodiment, stream 672 manipulation can be enacted independently of stream 644. In the embodiment, manipulation can include annotations, picture freeze, zoom, pan, rotate, and the like. For example, visual overlay tools such as text tools, polygon tools, and freehand drawing tools can be presented during a paused stream 672, allowing a user to annotate the frame.

Drawings presented herein are for illustrative purposes only and should not be construed to limit the invention in any regard. In one instance, device 620 can "push" stream 616 to device 610. In one configuration of the instance, device 620 can select PIP window 614 content which can be presented in PIP window 614. In another configuration of the instance, device 620 can select primary stream 612 which can be presented in device 610. In yet another configuration of the instance, content not associated with the primary stream 612 and enhanced stream 616 can be exchanged. For example, annotations created on device 620 associated with stream 616 can be conveyed and presented on device 610.

In one configuration of the embodiment 630, picture swapping capabilities can be present. For example, stream 612 can be swapped with stream 616 resulting in stream 616 presented on device 610 and stream 612 presented on device 620.

Figure 7:
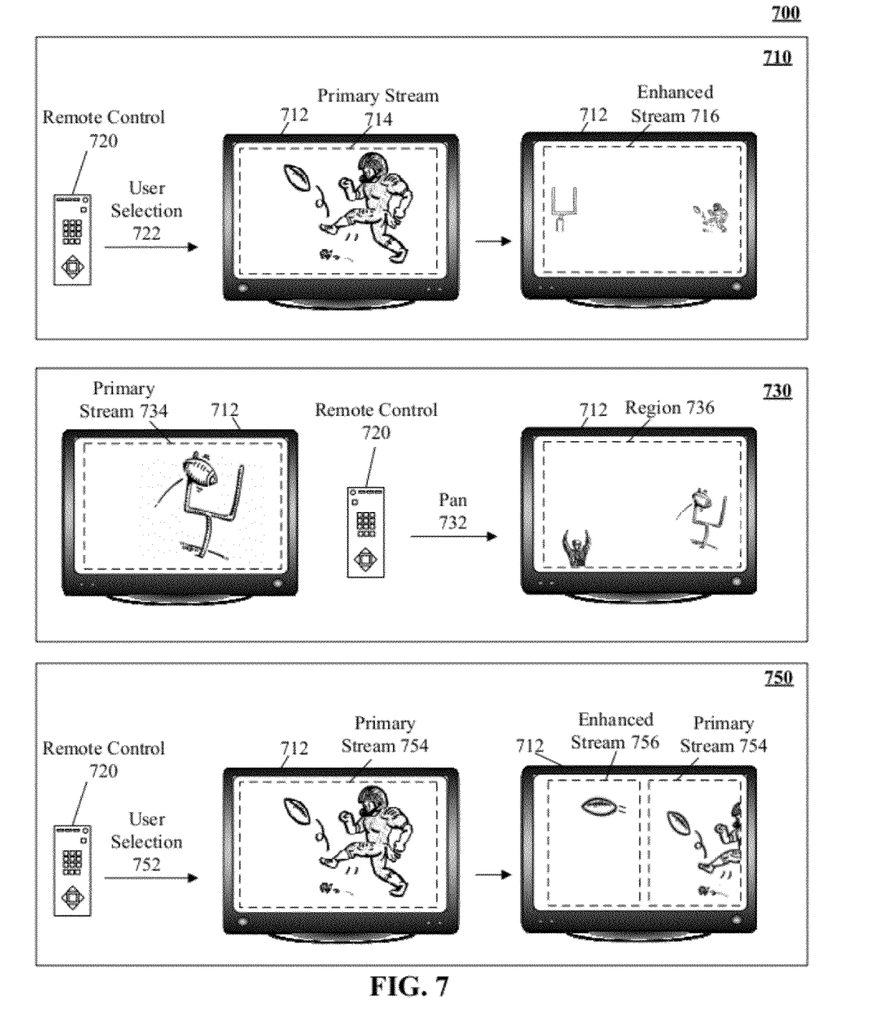
FIG. 7 is a schematic diagram illustrating a series of embodiments for simultaneously presenting an enhanced and primary stream associated with a digital television broadcast in accordance with an embodiment of the inventive arrangements disclosed herein.

FIG. 7 is a schematic diagram illustrating a series of embodiments 710, 730, 750 for simultaneously presenting an enhanced and primary stream associated with a digital television broadcast in accordance with an embodiment of the inventive arrangements disclosed herein. Embodiments 710, 730, 750 can be present in the context of system 100, 200 and method 300. In embodiments 710, 730, 750, a television remote control 720 can be employed to interact with primary and enhanced streams presented upon device 712. In embodiment 710, a remote control 720 can be utilized to select an enhanced stream 716 associated with a primary stream 714 presented on device 712. In embodiment 730, a remote control 720 can be utilized to pan a primary stream to present region 736 of an enhanced stream. In embodiment 750, a remote control 720 can permit presentation of a primary stream 754 and enhanced stream 756 concurrently on device 712.

In one configuration of embodiment 710, a user selection via remote 720 can present an enhanced stream 716 which can include content allowing zoom in/out capabilities to be performed. For instance, up and down arrow keys on remote 720 can allow a user to zoom in and out of an enhanced stream 716. In one instance, enhanced stream 716 can include a wider field of view than primary stream 714. In the instance, a user selection 722 can present an enhanced stream which can be a widescreen formatted version of primary stream 714.

In one configuration of embodiment 730, a user selection via remote 720 can trigger an enhanced stream to be presented following a primary stream 734 presentation. In the configuration, an enhanced stream region 736 can be presented in response to a pan 732 action when primary stream 734 lacks sufficient content. It should be appreciated that embodiment 730 can be enacted for any user-initiated action including zoom, replay, and the like.

In one configuration of embodiment 750, a user selection 752 can present primary stream 754 and enhanced stream 756 simultaneously on device 712. In one instance, stream 754, 756 can be dynamically stitched together to permit user interactions described herein. In one configuration of embodiment 750, remote control 720 can be utilized to interact with stream 754, 756, and the stitched stream.

The flowchart and block diagrams in the FIGS. 1-7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
concurrently presenting video on two different video playback devices to one user, wherein the two different video playback devices comprise a first playback device and a second playback device, wherein each of the two different video playback devices comprises a screen upon which video is concurrently presented to the user, wherein the screen of the first playback device receives content that it presents from a primary stream of video content, wherein at a first point-in-time the screen of the second playback device shows content approximately equivalent to what is shown on the first playback device;
the second playback device receiving a user input from the user to adjust a display property on the screen of the second playback device, wherein the video content presented on the screen of the first playback device is unaffected by the user input, wherein the user input is an input to "pan" or "zoom" the screen of the second playback device; and
responsive to the user input, adjusting an output presented on the screen of the second playback device, wherein a second point-in-time occurs after the adjusting of output responsive to the user input completes, wherein at the second point-in-time, the screen of the second playback device does not show content that is approximately equivalent to what is shown on the first playback device, wherein at the second point-in-time, video content presented on the screen of the second playback device comprises video content for a stitched together region that is dynamically stitched together from a first region of the primary stream and from a second region of an enhanced stream, wherein the stitching together of video content overcomes insufficiencies in content available from the primary stream alone.

2. The method of claim 1, wherein the user input is an input to pan the screen of the second playback device.

3. The method of claim 1, wherein the user input is an input to zoom the screen of the second playback device.

4. The method of claim 1, wherein the dynamically stitched together region is a continuous video region stitched together along a horizontal or vertical plane.

5. The method of claim 1, wherein throughout the method, an audio output from the first playback device and from the second playback device is substantially equivalent and is substantially unaffected by the user input.

6. The method of claim 5, wherein the primary stream results from a field of view being captured by a first camera, wherein the enhanced stream results from a different field of view being captured by a second camera, wherein regions of the fields of view captured by the first camera and by the second camera are either substantially adjacent regions or are overlapping regions.

7. A method comprising:
presenting video on a playback device, wherein the playback device is a video playback device comprising a screen upon which video of an event is presented, wherein at an first point-in-time, the video content shown on the screen is available within a primary stream of content;
dynamically updating video presentation on the screen of the playback device in response to a user input to pan, wherein a pan operation causes a shift-to-the-right, a shift-to-the-left, an upwards-shift, or a downwards-shift to a region shown on the video playback device, wherein the pan operation occurs in sequential increments of distance;
during the pan operation in which incremental shifts occur:
(i) reaching a regional boundary of the primary stream of content during the pan operation;
(ii) responsive to reaching the regional boundary, stitching a region of the primary stream to a region from an enhanced stream together; and
(iii) presenting a resulting spliced region as video output to the screen of the playback device, wherein the primary stream results from a field of view being captured by a first camera, wherein the enhanced stream results from a different field of view being captured by a second camera, wherein regions of the fields of view captured by the first camera and by the second camera are either substantially adjacent regions or are overlapping regions; and completing the pan operation at a second point-in-time, wherein at the second point in time the video output shown on the playback device is stitched from the region of the primary stream and from the region of the enhanced stream.

8. The method of claim 7, wherein the primary stream and the enhanced stream comprise video for a live event being presented on the video playback device.

9. The method of claim 7, wherein the playback device is equipped with an accelerometer or other motion sensing component, said method further comprising:

the playback device detecting a user motion as an input, wherein the user motion is a motion of tilting the playback device, wherein a direction of the detected user motion determines whether the pan operation shifts the region of the video playback device to the right, to the left, upwards, or downwards.

10. The method of claim 7, wherein the playback device is equipped with an accelerometer or other motion sensing component, said method further comprising:

the playback device detecting a user selection of an arrow having a characteristic direction as an input, wherein selection of a right arrow indicates the pan operation shifts the region of video playback to the right; wherein selection of a left arrow indicates the pan operation shifts the region of video playback to the left; wherein selection of an upwards arrow indicates the pan operation shifts the region of video playback upwards; wherein selection of a downwards arrow indicates the pan operation shifts the region of video playback downwards.

11. The method of claim 7, wherein two different video playback devices concurrently present video output to one user, wherein the two different video playback devices comprise a first playback device and a second playback device, wherein a screen of the first video playback device receives the content that it presents from a primary stream of video content, wherein playback of the first playback device is not affected by the user input, wherein said playback device is the second playback device, wherein at the first-point-in-time a screen of the first playback device and the screen of the second playback device show content approximately equivalent to each other.

12. A method comprising:

concurrently presenting video on two different video playback devices to one user, wherein the two different video playback devices comprise a first playback device and a second playback device, wherein each of the two different video playback devices comprises a screen upon which video is concurrently presented to the user, wherein the video shows pictures and audio for a production event within a geographically bound area, wherein a primary stream and an enhanced stream are available to the different video playback devices, wherein the primary stream is a stream of video content that comprises camera captured content for a first field-of-view of an area, wherein the enhanced stream is a stream of video content that comprises camera captured content for a second field-of-view of the area, wherein the screen of the first playback device receives the content that it presents from the primary stream of video content, wherein at a first point-in-time the screen of the second playback device shows content approximately equivalent to what is shown on the first playback device;

the second playback device receiving a user input to adjust the second field-of-view of the area on the screen of the second playback device, wherein the user input causes the second field of view of the area shown on the second playback device to incrementally change in a sequential increments of distance depending on a quantity of the user input, wherein the video content presented on the screen of the first playback device is unaffected by the user input; and responsive to the user input, adjusting an output presented on the screen of the second playback device, wherein a second point-in-time occurs after the adjusting of the output responsive to the user input completes, wherein at the second point-in-time, the screen of the second playback device shows a stitched region of the area, wherein the stitched region combines a subregion from the first field-of-view and a subregion from the second field of view, wherein content for the stitched region comes from dynamically stitching together at least portions of the primary stream and the enhanced stream.

13. The method of claim 12, wherein the user input is a user input to pan the screen of the second playback device.

14. The method of claim 12, wherein the user input is an input to zoom the screen of the second playback device.

15. The method of claim 12, wherein the adjusting of the second device field-of view per the user input comprises:

(i) reaching a regional boundary of the primary stream of content during the pan operation;

(ii) responsive to reaching the regional boundary, stitching a region of the primary stream to a region from the enhanced stream together; and (iii) presenting a resulting stitched region as the video output to the screen of the second playback device, wherein the first field-of-view and the second field-of-view are substantially adjacent regions or are overlapping regions of the area.

16. The method of claim 12, wherein the second playback device is equipped with a motion sensing component, said method further comprising:

the second playback device detecting a user motion as the user input, wherein the user motion is a motion of tilting the second playback device, wherein a direction of the detected user motion determines whether a second device field-of-view shown on the screen of the second device shifts a shown region to the right, to the left, upwards, or downwards.

* * * * *